No. 809,450. PATENTED JAN. 9, 1906.
R. KNIETSCH.
PROCESS OF MAKING SULFURIC ANHYDRID.
APPLICATION FILED SEPT. 24, 1901.
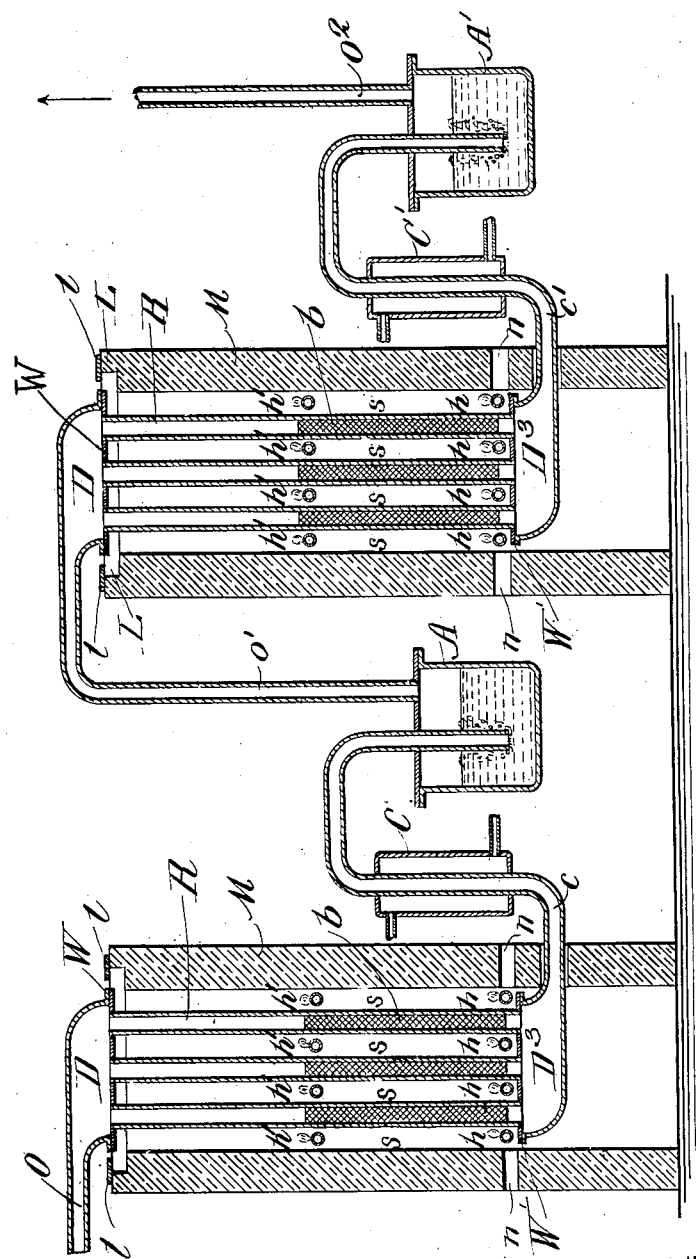
WITNESSES:
INVENTOR
BY
ATTORNEYS

UNITED STATES PATENT OFFICE.

RUDOLF KNIETSCH, OF LUDWIGSHAFEN-ON-THE-RHINE, GERMANY, ASSIGNOR, BY MESNE ASSIGNMENTS, TO GENERAL CHEMICAL COMPANY, A CORPORATION OF NEW YORK.

PROCESS OF MAKING SULFURIC ANHYDRID.

No. 809,450.      Specification of Letters Patent.      Patented Jan. 9, 1906.

Application filed September 24, 1901. Serial No. 76,332.

*To all whom it may concern:*

Be it known that I, RUDOLF KNIETSCH, doctor of philosophy and chemist, a subject of the King of Prussia, German Emperor, residing at Ludwigshafen-on-the-Rhine, in the Kingdom of Bavaria, Germany, have invented new and useful Improvements in the Manufacture of Sulfuric Anhydrid, of which the following is a specification.

After my discovery of the process described in my Patents No. 652,119, dated June 19, 1900, and No. 692,018, dated January 28, 1902, whereby a substantially quantitative production of $SO_3$ was for the first time accomplished by the contact method, it seemed from all analogy in the prior art to be incapable of further improvement, and certainly no way was apparent by which the materials employed could be economized without impairing the primary object—a substantially quantitative yield. Nevertheless, I have discovered an improvement on said process the result of which is to combine with the substantially quantitative yield of said process a saving of a large portion, approximately fifty per cent., of the contact material. In other words, I have discovered that if the gas containing sulfur dioxid and oxygen (exemplified in said Patent No. 652,119 by a mixture of gases containing about twelve per cent. by volume, of sulfur dioxid and a similar quantity of oxygen, the balance of the volume consisting, substantially, of an indifferent gas, such as nitrogen) is subjected to a succession of treatments by the process described in my said Patent No. 652,119 with an intermediate removal of the formed $SO^3$, a conversion which is from ninety-six to ninety-nine per cent. of that theoretically possible may be produced by the use of about fifty per cent. platinized asbestos less than would be necessary to accomplish a similar conversion by one treatment of said process.

In carrying out my process I employ two or more contact-chambers operating according to said process, each of which may be constructed as described in my said Patent No. 692,018, and between every two of these I interpose in the course of the gas passing from one to the other an absorbing apparatus for the $SO_3$, preferably constructed like that described in said Patent No. 692,018.

In case two contact-chambers are employed the amount of contact material in each of them will be only about one-quarter the amount heretofore used in operating under my said patents. The mixture of purified $SO_2$ gas with oxygen is passed through the first of these contact-chambers and is therein subjected to the catalytic action, while the excess of heat, due to the reaction, is removed from the contents of said chamber. A portion of the gas is thus converted into $SO_3$ while avoiding the decomposition of the $SO_3$. Thus the gas escaping from said first contact-chamber consists of unconverted $SO_2$ and oxygen mixed with $SO_3$. This gas then passes through said absorbng apparatus, wherein the $SO_3$ already formed is absorbed and from which the $SO_2$ and oxygen proceeds to and through the second contact-chamber, wherein it is substantially all converted into $SO_3$ by the same process as that applied in the first contact-chamber. The $SO_3$ thus formed passes then into a second absorbing apparatus, wherein it is separated from any waste gases that may be mixed with it.

In the accompanying drawing I have shown an apparatus containing two contact structures in each of which M is an inclosure which may consist of brickwork or other suitable material.

R represents the contact-chambers, (shown in the form of tubes,) supported at one end by the tube-plate W and at the other end by the tube-plate W'.

S is an air-passage surrounding the contact-tubes from end to end and having inlets $n$ at one end and outlets L, regulated by the adjustable dampers $l$.

$h$ represents means of heating the air-currents at or near the entrance to the passage S, which heating means should be capable of prompt extinction, lighting, and regulation, such as gas-flames or the equivalents.

$h'$ represents similar heating means located about midway the passage S. These heating means are shown as situated opposite the lower and upper ends of the contact material $b$, which extends substantially half the length of the tubes R.

D and $D^3$ are covers inclosing the opposite ends of each series of tubes.

O is a pipe leading to the apparatus from a source of mixture of gas containing sulfur dioxid and oxygen and the remainder consisting of an indifferent gas, such as nitrogen.

c is the exit for the product of the first apparatus, which extends through the cooler C and empties into the absorber A beneath the surface of an absorbing body of sulfuric acid contained therein, which absorbs the $SO_3$ and permits the remainder of the gases to pass onward through the pipe O' into the second part of the apparatus. The product of the second part of the apparatus escapes through the pipe c', which passes through the cooler C' and empties into the absorber A' beneath the surface of an absorbing body of sulfuric acid therein, which absorbs the $SO_3$ and permits the waste gases to escape through the pipe $O^2$.

This process, while allowing of the production of as good a yield of sulfuric anhydrid as is obtained under the process of my said patents, permits of more than half of the platinum, and in some cases as much as seventy per cent. thereof, being dispensed with. The importance of this will be apparent from the fact that I have found that in operating under my said Letters Patent without the present improvement a relatively small amount of platinum contact material sufficed to convert from seventy to ninety per cent. of the sulfurous acid into sulfuric anhydrid, but that to further increase the percentage of conversion an inordinately large quantity of platinum was necessary. If, for example, with one hundred parts of platinum a total conversion of ninety-seven per cent. was obtained, the production of the first eighty per cent. of the sulfuric anhydrid only required about fifteen parts of the total platinum employed, while for the remaining seventeen per cent. a further eighty-five parts of the platinum was necessary.

My process can be varied by dividing it into more than two contacts—for example, three contacts—thus still further increasing the total conversion; but as a general rule two contacts will be found sufficient for practical purposes, and the first conversion should preferably amount to from eighty to ninety per cent. In this manner a sulfuric anhydrid or sulfuric acid can be obtained from the first operation, which does not contain so much sulfuric acid as to make it unfit for technical purposes.

Having thus described my invention, I claim as new and desire to secure by Letters Patent—

1. The process of manufacturing sulfuric anhydrid which consists in passing sulfurous-acid gas and oxygen over contact substance containing platinum, interrupting the process when the conversion has been partially effected, removing sulfuric anhydrid formed and subjecting the unconverted gases thus freed from sulfuric anhydrid to further action of contact substance containing platinum.

2. The process of manufacturing sulfuric anhydrid which consists in passing sulfurous-acid gas and oxygen over contact substance containing platinum which is subjected to a regulated cooling so as to remove the excess of heat due to the reaction, interrupting the process when the conversion has been effected to an extent of about seventy to ninety per cent., removing sulfuric anhydrid formed and subjecting the unconverted gases thus freed from sulfuric anhydrid to further action of contact substance containing platinum.

3. The process of manufacturing sulfuric anhydrid which consists in passing sulfurous-acid gas and oxygen over contact substance containing platinum, interrupting the process when the conversion has been partially effected, removing sulfuric anhydrid formed and passing the unconverted gas thus freed from sulfuric anhydrid over contact substance containing platinum, interrupting the process when a portion of the remaining sulfur dioxid has been converted into sulfuric anhydrid, removing sulfuric anhydrid formed and subjecting the remaining unconverted gases to further action of contact substance containing platinum.

In testimony whereof I have hereunto set my hand in the presence of two subscribing witnesses.

RUDOLF KNIETSCH.

Witnesses:
PAUL SEIDEL,
JOHN L. HEINKE.